May 11, 1948.  A. Y. DODGE  2,441,347
UNIVERSAL JOINT
Original Filed May 11, 1940
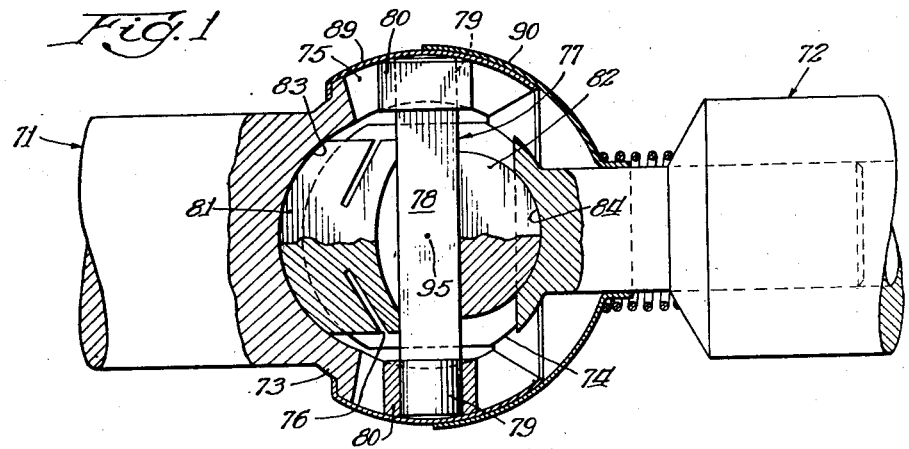
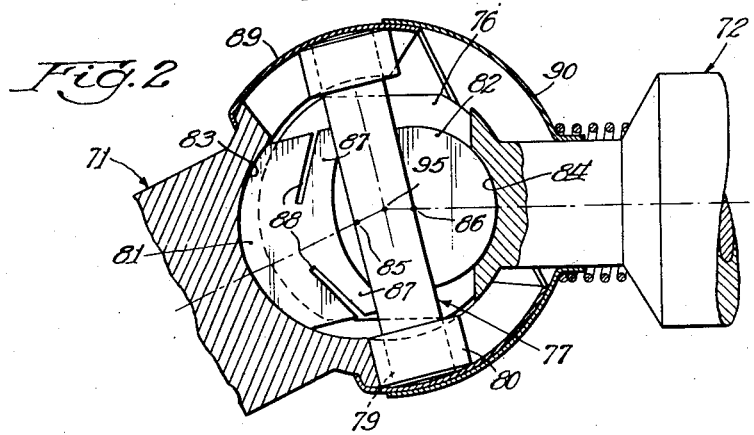
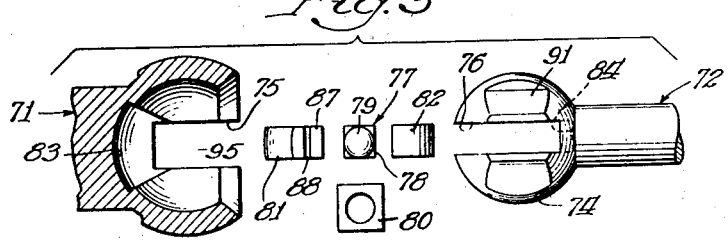
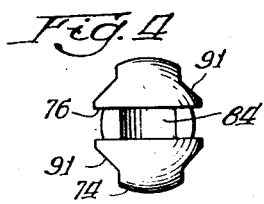
Inventor:
Adiel Y. Dodge
By: Edward C. Fritzbaugh
Atty.

Patented May 11, 1948

2,441,347

UNITED STATES PATENT OFFICE 2,441,347

UNIVERSAL JOINT

Adiel Y. Dodge, Rockford, Ill., assignor to Borg-Warner Corporation, Chicago, Ill., a corporation of Illinois Original application May 11, 1940, Serial No. 334,517. Divided and this application November 8, 1943, Serial No. 509,428

5 Claims. (Cl. 64—21)

1

This application is a division of the copending application of Adiel Y. Dodge, Serial No. 334,517, filed May 11, 1940, for "Constant velocity universal joint" which is now patent No. 2,341,084, dated February 8, 1944.

The object of this invention is to provide an improved universal joint having at least substantially the characteristics of constant velocity and embodying the three axis principle.

While there have been many forms of constant velocity joints introduced, there are comparatively few in use for one or more of the following reasons. The designs proposed have been prohibitive in cost, excessively large in size to handle the required torque, and usually difficult to assemble. In the present invention, two or more of the above objections have been eliminated or reduced to a minimum, in a joint having at least substantially constant velocity characteristics.

The primary object of any constant velocity universal joint is to transmit torque from a driving member to a driven member in such a manner as to eliminate fluctuation in the angular velocity of the driven member. Such fluctuation is an inherent characteristic of the conventional Cardan type joint embodying a connecting member in the form of a spider having trunnions journalled in the yokes of the driving and driven members respectively.

It has been known to the art for some time that a substantially constant velocity joint can be constructed having as few as three axes of oscillation of its parts in addition to the two axes of rotation of the driving and driven members respectively. The present invention embodies this principle in a universal joint of maximum simplicity of construction.

In the embodiment of my invention, I employ a spider member or its equivalent having two trunnions which provide the major axes of oscillation of the yoke members relative to the spider, and have provided a subordinate axis of axes by allowing the trunnions to oscillate on an axis or axes 90° removed from the axes or axis of the trunnion.

In one of its aspects, the invention aims to retain as far as possible the advantages which underlie the success of the conventional trunnion type joint. One of the most important of these advantages is the virtual elimination of friction between the relatively shiftable coacting members through which torque is transmitted.

Means are provided for positioning the axes

2 of the oscillatable bearings in a plane constantly bisecting the angle of the yoke axes of rotation, so as to maintain the angular velocity of the driven member constantly the same as that of the driving member.

This arrangement secures the third axis without adding parts or weight or increasing the size of the joint.

In the embodiment of the invention, additional reduction in the number of parts and in weight is made by employing only two trunnions and the two additional axes are secured by arranging for both yoke members to oscillate relative to the trunnions on axes that are ninety degrees removed from each other.

Other objects, the advantages and uses of the invention will become more apparent after reading the following specification and claims, and after consideration of the drawing forming a part of the specification, wherein:

Fig. 1 is a longitudinal sectional view of one form of the invention;

Fig. 2 is a longitudinal sectional view of the same in a position of angularity of the shafts;

Fig. 3 is an exploded view of the same;

Fig. 4 is a detailed end view of one of the elements of the joint shown in Figs. 1, 2 and 3.

In the embodiment of the invention shown in Fig. 1, it is my object to achieve maximum simplicity of construction and reduce expense to a minimum, while achieving at least substantially constant velocity characteristics. To this end, the invention provides a pair of yoke members 71 and 72, the yoke 71 having a spherical socket portion 73 and the yoke 72 having a ball head 74 snugly socketed in the socket portion 73. The socket portion 73 and ball 74 are bifurcated by slots 75 and 76 respectively which are disposed in a common plane in the assembled joint. A connecting member 77 has a squared central portion 78 embraced in the slot 76 and cylindrical end trunnions 79 received in bearing bushings 80, which are embraced in the slots 75.

Torque is transmitted from the yoke 71 to the bearings 80, thence to the connecting member 77, and thence to the yoke 72, the bearings having rectangular peripheries as shown in Fig. 3 and being adapted to oscillate in the slot 75.

The axes of the trunnions 79 form a major axis about which the yokes 71 and 72 may oscillate.

The reference numeral 95 indicates two coincident auxiliary axes of oscillation of yoke members 71 and 72 relative to each other on the one hand and of the connecting member 77 relative to the yoke members on the other hand. Thus, the joint shown in Figs. 1 to 4 embodies the three axis principle.

The connecting member 77 is adapted to oscillate in both the slots 76 and 75 so as to constantly maintain a position bisecting the angle between the axes of the yokes.

I provide means for maintaining the connecting member in this bisecting position, in the form of flat arcuate or crescent shaped control elements 81 and 82 respectively, engaged in arcuate recesses 83 and 84 respectively in the respective yoke members. The centers of curvature of the recesses 83 and 84, indicated at 85 and 86, are removed from the common center of the joint along the axes of the respective yoke members. The opposed edges of the control elements 81 and 82 are flat and in sliding engagement with the sides of the connecting member 77. The elements 81 and 82 remain at all times in a common plane which oscillates, with reference to the yoke member 71, about the axis of the bearings 80, i. e., the element 81 swings back and forth in its recess 83 in a direction transverse to its direction of oscillation about the center 85. In order to permit such swinging movement, the recess 83 is fan-shaped in cross-section as shown in Fig. 3, the transverse curvature of its curved surface being generated so that all points on a given radial cross-section thereof are equidistant from the center 95, so as to avoid cramping of the element 81 in the side regions of its lateral swinging movement, which would occur if the surface were truly spherical.

In order to provide yielding pressure for maintaining snug engagement between the control elements and the connecting member, at least one of the elements as for example the element 81 is provided with yieldable tongues 87 separated from the body thereof by slots 88.

The joint is enclosed in a housing comprising a pair of semi-cylindrical shell members 89 and 90 mounted upon the respective yoke members 71 and 72.

In order to facilitate the assembly, the head 74 may have its lateral surfaces cut away as at 91 in Figs. 3 and 4.

The control mechanism of the joint shown in Figs. 1 to 4 inclusive embodies a spider member having trunnions on which the bearing cups are mounted and a pair of control elements engaging the respective sides of the spider member, each pivotally associated with the respective yoke members, and adapted to slide with reference to the spider member in a direction parallel to the axis or axes of the trunnions thereof. The axis joining the two pivot centers of the control elements will always subtend equal angles with reference to the two axes of rotation and consequently the plane of the trunnion axis or axes which is maintained at right angles to the axis of said pivots, will constantly bisect the angle of the axes of rotation.

It will now be seen that my invention provides a universal joint embodying the three axis principle, which is of maximum simplicity of construction, relatively inexpensive, easy to assemble and dismantle, and yet sturdy and long-lived.

I claim:

1. A substantially constant velocity universal joint comprising a pair of yokes embodying spherically shaped interengaged members that are slotted to provide diametrically opposed axially elongated slideways that bifurcate said members, said spherically shaped members having common centers, an oscillatory center member having a plurality of trunnions, a bearing encircling each trunnion, said center member guided in its oscillatory movement by engagement of said bearings in diametrically opposed slideways, and means extending between said center member and said yokes to maintain the axis of said bearings at all times the bisector of the axes of said yoke members, said means comprising control members projecting away from opposite sides of said center member, at least one of said control members having a yieldable tongue pressing against said center member, the portions of said control members that are remote to the center member having arcuate shape and movably engaged in counterpart seats in the bases of said yokes, the arcuate portions of said control members and their counterpart seats in said yokes being curved about centers that are removed from the common center of the yokes.

2. A substantially constant velocity universal joint comprising a pair of yokes of spherical shape that are bifurcated by respective slots, each yoke having adjacent the base of its respective furcation a recessed seat that is curved about a center that is removed toward its respective yoke along the axis thereof in directions away from the common center of said yokes, said seats having fan-shaped cross section, and connecting means disposed on the diameter of said common center, said connecting means comprising an intermediate portion that is received in the yoke furcations to provide a torque transmitting connection between said yokes, and elements extending from opposite sides of said intermediate connecting portion, said elements having curved portions conforming to the curvature of said seats and oscillatably engaged therein to swing around the axis of said intermediate portion, for maintaining the longitudinal axis of said connecting means at all times the bisector of the axes of said yokes.

3. A substantially constant velocity universal joint, a pair of yokes, one formed with a spherical socket and the other with a ball head journalled in said socket, said socket and head being bifurcated by respective slots lying in the common plane of the axes of the yokes, and each having at the base of its respective slot an arcuate depression curved about a center which is removed toward its respective yoke along the axis thereof from the common center of said socket and head, connecting means disposed on the diameter of said common center, having an intermediate region received in the slots of the head and end regions received in the slots of the socket so as to form a torque transmitting connection between said yokes, and crescent shaped control elements interposed between the respective sides of said connecting means and said arcuate recesses and oscillatable in their respective recesses, for maintaining the longitudinal axis of said connecting means at all times the bisector of the axes of the yokes.

4. A constant velocity universal joint as defined in the preceding claim, wherein said connecting means comprises a pin the sides of which are snugly received between the furcations of the ball head, and the ends of which are formed as trunnions, and bearings encircling said trunnions and embraced between the furcations of the sockets and oscillatable therein on the common center of the joint.

5. A substantially constant velocity universal joint comprising a pair of interengaged spherical yokes that are bifurcated by respective slots lying in the common plane of the axes of the yokes, each yoke provided with an arcuate depression curved about a center which is removed toward its respective yoke along the axis thereof from the common center of said yokes, a center member having flat sides that are disposed in the furcations of said yokes, said center member having end trunnions provided with bearings that oscillate in the furcations to form a torque transmitting connection between said yokes, and segmental shaped control elements having flat bases that are engaged with the flat sides of said center member and slidable thereon, the arcuate outer portions of said control elements movably engaged in said recesses for maintaining the center member at all times the bisector of the axes of the yokes.

ADIEL Y. DODGE.

REFERENCES CITED

The following references are of record in the file of this patent:

UNITED STATES PATENTS

| Number | Name | Date |
|---|---|---|
| 1,375,985 | Thiemer | May 24, 1921 |
| 1,625,410 | De Ram | Apr. 19, 1927 |
| 1,983,533 | Brown | Dec. 11, 1934 |
| 2,234,296 | Wollner | Mar. 11, 1941 |
| 2,293,717 | Dodge | Aug. 25, 1942 |